(12) United States Patent
Whittam et al.

(10) Patent No.: US 8,134,848 B2
(45) Date of Patent: Mar. 13, 2012

(54) CLOSED-LOOP EFFICIENCY MODULATION FOR USE IN AC POWERED APPLICATIONS

(75) Inventors: Simon P Whittam, Kanata (CA); John S. Gryba, Stittsville (CA); Michael W. Parrell, Stittsville (CA)

(73) Assignee: Alcatel Lucent, Paris (FR)

( * ) Notice: Subject to any disclaimer, the term of this patent is extended or adjusted under 35 U.S.C. 154(b) by 393 days.

(21) Appl. No.: 12/540,155

(22) Filed: Aug. 12, 2009

(65) Prior Publication Data

US 2011/0038189 A1 Feb. 17, 2011

(51) Int. Cl.
*H02M 5/42* (2006.01)
(52) U.S. Cl. .......................................... 363/84
(58) Field of Classification Search .............. 363/78–81, 363/84, 89, 125, 127; 323/282, 283, 285
See application file for complete search history.

(56) References Cited

U.S. PATENT DOCUMENTS

| | | | |
|---|---|---|---|
| 6,577,516 B1 * | 6/2003 | Thoren et al. | 363/84 |
| 7,688,041 B2 * | 3/2010 | Ng | 323/207 |
| 2008/0049473 A1 * | 2/2008 | Sugahara et al. | 363/89 |
| 2010/0091531 A1 * | 4/2010 | Lum | 363/84 |

* cited by examiner

*Primary Examiner* — Matthew Nguyen
(74) *Attorney, Agent, or Firm* — Kramer & Amado, P.C.

(57) ABSTRACT

A system and method for closed-loop efficiency modulation for an AC/DC power system is provided. A boost-buck converter and a DC/DC converter connected in series receive a rectified DC feed signal from a AC input signal and deliver a modified DC output to an active load. A controller receives power data at various stages of the system and uses that data to modify a series of trim voltages provided to the feedback inputs of the respective converters to modify each converters output voltage. The controller modifies each converter's output voltage to maximize power efficiency while monitoring other data in the system to ensure the system is operating correctly and safely.

16 Claims, 5 Drawing Sheets

| AC | $V_{IN}$ | $I_{IN}$ | $P_{IN}$ | $V_1$ | $I_1$ | $P_1$ | $V_{LOAD}$ | $I_{LOAD}$ | $P_{LOAD}$ | $Eff_{power}$ |
|---|---|---|---|---|---|---|---|---|---|---|
| | | | | | | | | | | |
| | | | | | | | | | | |
| | | | | | | | | | | |
| | | | | | | | | | | |
| | | | | | | | | | | |
| | | | | | | | | | | |

FIG. 6

CLOSED-LOOP EFFICIENCY MODULATION FOR USE IN AC POWERED APPLICATIONS

BACKGROUND

1. Technical Field

The embodiments relate generally to power efficiency in power supply systems.

2. Description of Related Art

Engineers have historically used DC power supplies to act as a buffer between the equipment requiring electrical power and the primary electric power source. In the United States and many other nations, electric power is usually transmitted using AC power, which, in turn, requires some form of an AC/DC converter to convert the delivered AC power to a form that the equipment can properly use. Switching-mode DC power supplies convert AC voltage to DC voltage using components with low losses in power dissipation, such as capacitors, inductors, transformers, and switches (transistors, diodes etc).

The efficiency of a switching mode power supply (SMPS) varies depending on the load. For example, a SMPS operates at a much higher efficiency when fully loaded than at low loads. There are three main areas where one can increase efficiency for any given circuit: (1) current harmonics drawn from the main source (power factor), (2) component losses, and (3) architecture of the system.

In an effort to lower the harmonics involved when converting AC power drawn from the main source to DC power delivered to the load, engineers regularly use some form of Power Factor Correction (PFC) to increase the amount of real power delivered to the device. One form of such power factor correction involves the use of a power electronic circuit that controls the amount of power drawn by a load in order to obtain a power factor near unity.

For switched mode power supplies, engineers use a boost converter as a DC/DC power factor correction converter between the rectifier and the load, as it maintains a constant DC bus voltage on its output while drawing current that is always in phase with and at the same frequency as the line voltage. However, a boost converter only creates a higher-voltage regulated DC output, which also requires another switch-mode converter in series with the boost converter to produce the desired output voltage from the DC bus for use with other devices.

This topology may increase power factor, but it does not optimize the overall power efficiency of the whole system, as it does not address the system architecture or component losses. For example, the operating set points, the input and output voltages of the first and second converters, may not be optimized with each other to minimize power dissipation within the whole system. This is because two main sources of power dissipation in component losses, conduction losses and switching losses are dependent upon current and voltage respectively. For a given output power, current and voltage are inversely proportional, so that minimizing one power loss may create an unacceptable value for other power losses.

The device receiving the rectified DC power of the system may also operate at different states. For example, a telecommunications device may operate in an "active" stage and a "standby" stage that require the system to delivering varying DC power. Therefore an AC/DC conversion system may need to use differing operating set point dependent upon the voltage actually required by the load; a value that may vary over time.

Based on the prior art, there is therefore a need for an AC/DC power conversion system that maximizes the power efficiency of the entire system while also operating safely within the parameters of the components comprising the system. The system also needs to adjust dynamically to any changes in the load that may require varying operating set points based on the AC feed signal input and the DC supply signal output.

SUMMARY

In light of the need for an efficiency-loop AC/DC power conversion system, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

One embodiment comprises a staged series of DC/DC converters to deliver a rectified DC voltage to a load and a controller to monitor the power efficiency of the DC/DC converters and adjust their outputs to maximize the system's power efficiency. According to one aspect, the first DC/DC converter may be a boost-buck converter.

One embodiment includes a series of sensors that monitor the input and output feed signals of the first and second converters to create a series of datasets to provide to the controller based on, for example, the sensed amperages and voltages. According to one aspect, the controller identifies an efficiency of one or more of the DC/DC converters based on the sensors' output dataset, and thereby uses the sensor datasets to adjust outputs of the converters to maximize power efficiency.

According to one aspect of one or more embodiments, a series of trim voltage providers is included to provide trim voltages to the feedback inputs of the first and second DC/DC converters based on a trim voltage dataset created by the controller.

The foregoing objects and advantages of the invention are illustrative of those that can be achieved by the various exemplary embodiments and are not intended to be exhaustive or limiting of the possible advantages that can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

BRIEF DESCRIPTION OF THE DRAWINGS

In order to better understand various exemplary embodiments, reference is made to the accompanying drawings, wherein:

FIG. 6 illustrates a table of calculated power efficiencies for each operating set point.

DETAILED DESCRIPTION OF THE PREFERRED EMBODIMENTS

Figure 1:
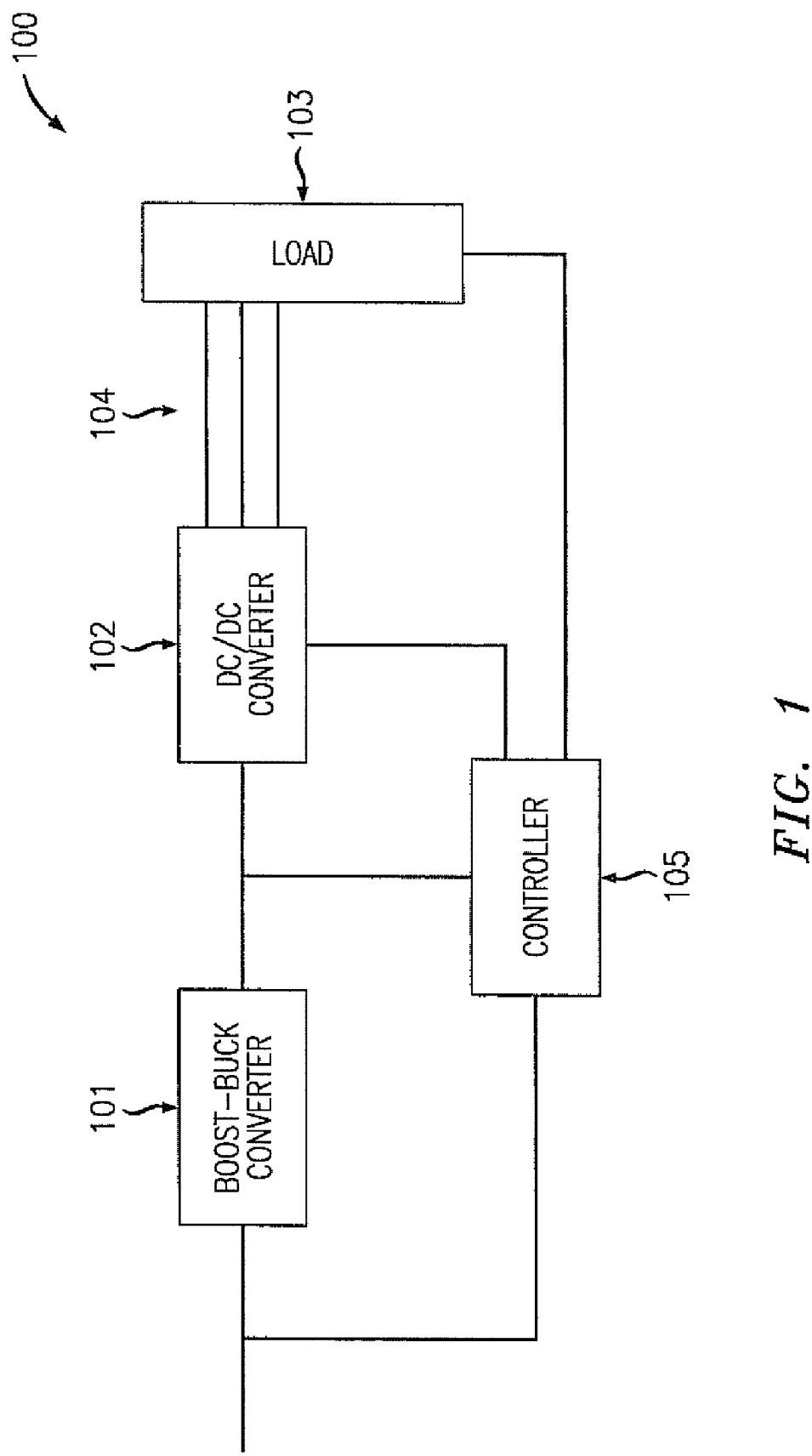
FIG. 1 illustrates a topology of the AC/DC power supply system.

The foregoing objects and advantages of the invention are illustrative of those that can be achieved by the various exemplary embodiments and are not intended to be exhaustive or limiting of the possible advantages that can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

According to the exemplary embodiments, an AC-to-DC power converter contains, in addition to an AC-to-DC rectifying means, a first DC/DC active Power Factor Correction (PFC) converter and a second DC/DC converter. As with any conversion circuitry, both converters dissipate lost power during operation, due to both switching losses and conduction losses, in addition to other losses, such as copper wire losses, inductor losses, and drops across diodes, among others. These losses are unavoidable, but, as will be understood from this disclosure, the present embodiments provide, among other features, a minimization of these losses. Conduction losses are a second order function of the input current according to the formula $P_{cond} = I_{input}^2 R$, while switching losses are a second order function of the input voltage according to the formula $$P_{sw} = \frac{1}{2} C V_{input}^2 f.$$

To minimize overall power loss, a control system according to one or embodiments finds equilibrium between minimizing both losses for a given input power. However, the converters do not necessarily have the same topologies or share the same values for conduction and switching losses, meaning each converter's equilibrium operating set point may be different. As will be understood upon reading these detailed descriptions, the one or more aspects of the present embodiments provide the different operating set points at which an acceptable equilibrium is obtained.

To minimize the differing amounts of conduction losses and switching losses in the overall AC-to-DC power system, a preferred embodiment incrementally adjusts one or both of the output voltages of the first converter, a boost-buck PFC converter, and a second converter, a DC/DC converter. Such adjustment takes place under the control of a controller, such as, for example, a microprocessor that signals other components to send through, for example, a series of analog-to-digital converters (ADCs) specific voltages to the feedback inputs of the respective converters. The respective converters, may, for example, modify their pulse-width modulation in response to the received feedback, modifying their outputs to match the received inputs.

In one embodiment, the controller comprises the entire system of controlling components, including a main processor and other devices that monitor and control the boost-buck PFC converter and the DC/DC converter, such as feed monitors that monitor the DC output signals at each stage for current and voltage values, and trim voltage providers that supply trim voltages to the converters in order to modify each respective converter's output voltage.

In one embodiment, the controller for the system may collect data related to the power at the input and output of the first converter, i.e., data indicating the power dissipation of the first converter, and similarly, the input and output power of the second converter and calculate the DC power efficiency of the circuit based on the collected values at an operating set point defined by the input and output voltage values of the AC/DC system for a given active load at the system's output. The controller may then actively modify at least one of the converters (or both) to change the operating set point and subsequently calculate the power efficiency based upon the modified values for the new set point.

The controller continues this process until it finds a new set point for a given load that minimizes the total power loss and maximizes power efficiency. At this first minimum set point, the controller may analyze other collected data, such as temperature, alarm conditions, and load status, to determine if the first minimum set point is within the system's normal operating conditions. The normal operating condition may, for example, be loaded into the processor during a system initialization. If the set point is within the system's normal operating condition, the process halts until the active load at the output (or the rms value of the AC voltage input) changes. If the first minimum set point is not within working conditions, the controller continues the process until it determines a minimum set point that is within the normal operating conditions of the system.

In another embodiment, the controller records its efficiency calculations for varying set points in a table or equivalent. Subsequently, the controller uses the table to determine the appropriate minimum set point for a given load without the need to continually traverse the varying set points to find the conditions for optimum efficiency. According to one aspect, a manufacturer may record all the data into the table and save the table into the system memory before distribution. In an alternative embodiment, each system creates its own table during regular operation.

Referring now to the drawings, in which like numerals refer to like components or steps, there are disclosed broad aspects of various exemplary embodiments. FIG. 1 shows the topology of main components of the AC/DC system 100. A first converter 101 may be a non-isolated boost-buck converter. A boost-buck converter has the ability to both boost and buck an incoming rectified DC voltage received at its input and has a direct path between its input and its output. As will be understood as a novel feature in this embodiment, the first converter can output a DC voltage ranging from, for example, 100-400 V from an input voltage of 85-265 V rms at 50-60 Hz. These values are merely illustrative, used to describe example operations, and do not limit the range of this or other embodiments. In one embodiment, the first converter is a single-ended primary inductor converter (SEPIC). A SEPIC also has the ability to boost or buck an incoming rectified DC voltage and produce a positive voltage at its output.

Referring to the FIG. 1 example, the first converter 101 is connected in series with a second converter 102, which is an isolated DC/DC converter. In one embodiment, the second converter 102 may be an isolated DC/DC converter, such as a flyback, push-pull, or forward converter that receives the first converter's DC output voltage and outputs a lower magnitude positive or negative voltage. In one illustrative example, the second converter 102 may be selected or configured to comply with voltage conventions such as, for example, a standard convention for telecommunication devices and, therefore, may buck a received voltage of, for example, 100-400 V down to an example −(39-75) V voltage range.

An active load 103 is connected to the second converter 102 via bus 104. The "active load" is defined as a load whose power requirements may change during normal operation of the system. The active load may be, for example, a telecommunications device that has varying power needs, such as a router, switch, or hub that operates in active and standby modes. However, the active load is not limited to such devices and includes any device on the receiving end of the system with varying power needs or experiences changes in voltage. The active load may include devices such as batteries in electric vehicles. It is contemplated that systems having one or more embodiments may feed an active load that may be an appreciable distance away from the second converter. A result of such distances means that a non-negligible voltage drop occurs along the length of the bus. As will be understood upon reading this disclosure, one or more embodiments provide power efficiency increases that accommodate such voltage drops.

Referring to the FIG. 1 example, a controller 105 is connected to various points of the AC/DC system 100. In one example implementation, the controller 105 may use the I²C communications standard to connect with the other components 101, 102, 103 and collect data. According to one or more examples, the controller 105 may be, but is not necessarily, a microprocessor. For example, as one alternative embodiments the controller 105 may be a programmable logic device (such as CPLD, FPGA, ASIC, etc.) connected to the microprocessor. Another preferred embodiment includes a memory module connected to the microprocessor.

The controller 105 receives data from the input and output of each respective converter 101, 102. In one embodiment, a series of power loss sensors (embodied by AC Feed Monitor 201 and BUS Feed Monitor 204 in FIG. 2) collects the data, which may be included in the controller or other components in the system. The data collected by the power loss sensors 201, 204 include data related to power, including voltage and current, and other data related to the proper functioning of the system, including temperature and alarm status. The controller 105 also receives data from the active load 103 through a power loss sensor not shown in the illustration. The data collected at the active load contains additional information, including load status.

If off-the-shelf units are used to implement the converters 101, 102, the controller 105 may be connected, either directly or through other components, with the feedback inputs of the respective converters 101, 102. Their feedback inputs may be separate from the input terminal of the circuit. The controller 105 may modify the voltages sent to the feedback terminals of converters 101, 102 which subsequently cause the converters 101, 102 to modify their outputs. In the method depicted at FIGS. 4 & 5 as described herein, the controller 105 may modify the feedback inputs of the respective converters 101, 102 independently from one another and the controller 105 may therefore set each converter 101, 102 to operate at a respective operating point. As will be understood from this description, the different points selected to minimize the total power loss, thereby obtaining overall system optimization.

Figure 2:
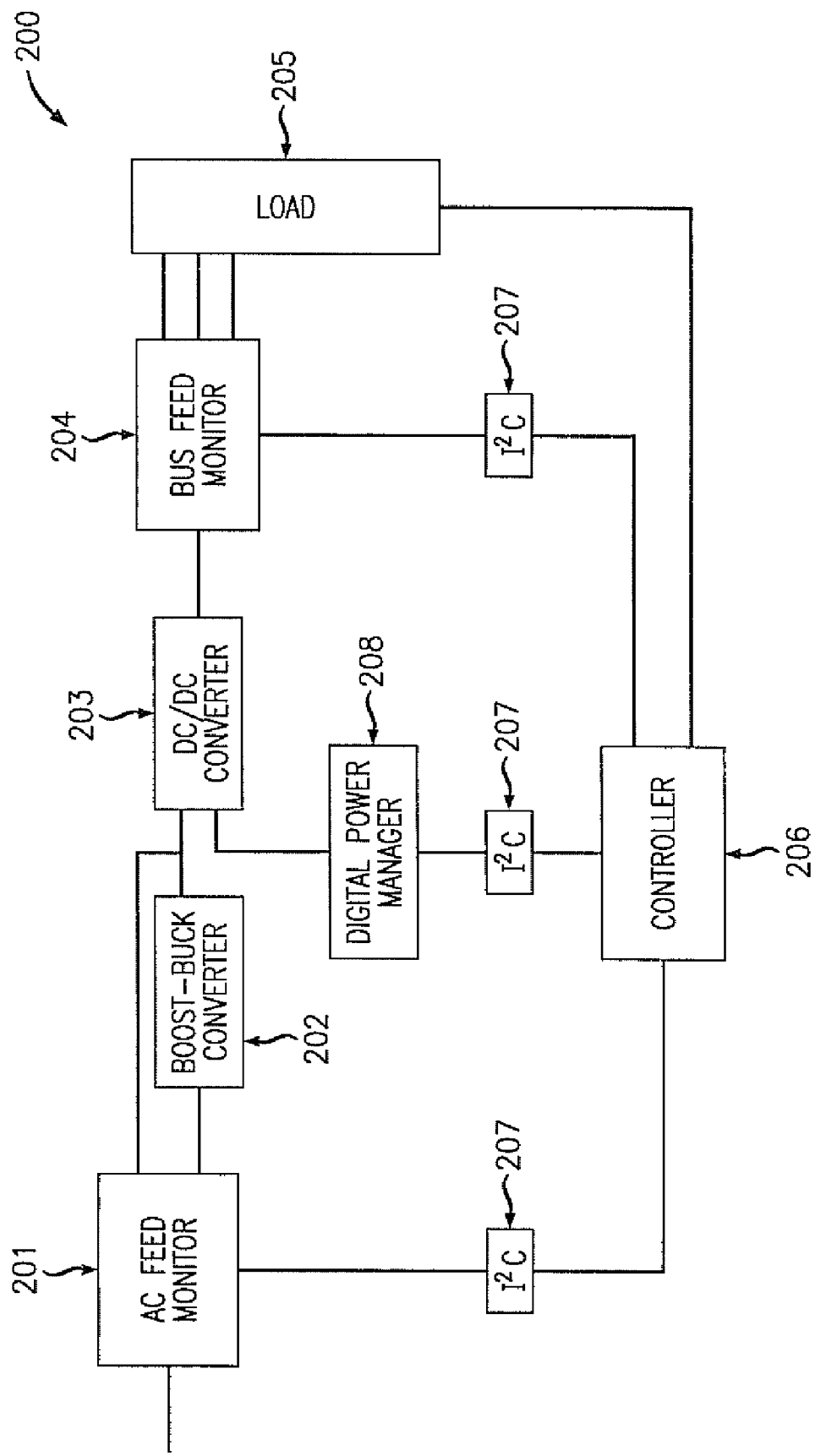
FIG. 2 illustrates another illustration of a topology of the AC/DC power supply system.

FIG. 2 shows a more detailed topology of an example AC/DC system 200 as also depicted in FIG. 1. Referring to FIG. 2, AC Feed Monitor 201 may be connected in series between the AC feed and the input terminal of the first converter 202. In a one embodiment, the AC Feed Monitor 201 acts as a first power loss sensor, collecting data from the input and output nodes of the first converter 202. The AC Feed Monitor 201 may also provide data related to the input AC power to the controller 206. The AC Feed Monitor 201 collects the root-means-squared (rms) values of the incoming AC feed and delivers this data to the controller 206.

In one example, the AC Feed Monitor 201 has an input that receives the AC voltage and through a rectifier not shown in the illustration, delivers a first DC voltage to the first converter 202. The AC Feed Monitor 201 may also include a current-sensing resistor $R_{sense}$, in series with an inrush relay, which itself is connected in parallel with a thermistor. Such an embodiment allows the relay to disconnect the AC Feed Monitor 201 from the first converter 202. In an alternative embodiment, a MOSFET may be connected in series with the current-sensing resistor. A voltage divider made of two resistors may act as a voltage monitor, which may be connected in series before the current-sensing resistor. The AC Monitor can for example, send enable or disable signals the first converter 202, relay, or MOSFET. During fault conditions, such as an alarm being triggered or a current spike from the input AC feed, the AC Feed Monitor 201 uses such a signal turns off the inrush relay, MOSFET, or first converter 202 to shutdown the input feed.

In one example, the AC Feed Monitor 201, under the control of the controller 206, modifies the output of the first converter 202 by supplying a trim voltage to the feedback input node of the first converter 202. For example, communications between the AC Feed Monitor 201 and the controller 206 may traverse using an I²C communications interface.

The AC Feed monitor may include a digital-to-analog converter (DAC) connected directly to the feedback input of the first converter 202 to produce a trim voltage $DACOUT_1$, to the feedback input of the first converter 202. As described in greater detail in later sections, $DACOUT_1$ and other trim voltages are generated through an optimization point seeking process. It will be understood, though, that an unconstrained search for the optimal points may produce unacceptable voltage levels. Therefore, in one example, at least one of either the AC Feed Monitor 201 or the controller 206 may be pre-programmed to prevent over-voltage or under-voltage trim or margining conditions that may occur at the first converter's output. These components may also be pre-programmed to monitor and prevent over-current at the input, so as not to stress components, such as the input fuse and filtering.

In one example, the AC Feed Monitor 201 includes a rectifier receiving the AC feed voltage to produce a rectified DC voltage output to the input terminal of the first converter 201. Alternative embodiments include all other known AC-to-DC conversion means to produce a constant DC voltage from an AC input.

A BUS Feed Monitor 204 may be connected in series between the output of the second converter 203 and the bus providing the load voltage $V_{load}$, to the active load 205. The BUS Feed Monitor 204 acts as the second power loss sensor, collecting data at the output of the second converter 203 and providing, through I²C communications, for example, the data to the controller 206.

In one example, opto-isolators 207 using the I²C communications standard are used to isolate components using different reference grounds. It is understood that the opto-isolators are not limited to I²C communications; rather, it is understood in the art that any isolation communications can be used, such as SPI or SMBUS. For example, to provide usability in telecommunications applications, a series of opto-isolators 207 isolate the example controller 206 from the AC Feed Monitor 201, the BUS Feed Monitor 204, and a Digital Power Manager (DPM) 208. There is no isolation between the controller 206 and the active load 205 when the components share a common ground.

In one example, a digital power manager 208 may be connected to the second converter 203 and communicate through an I²C opto-isolator 207 with the controller 206. In one alternative embodiment, the controller 206 incorporates all the components of the digital power manager 208 and connects directly to the second converter 203 when they share a common ground terminal.

Figure 3:
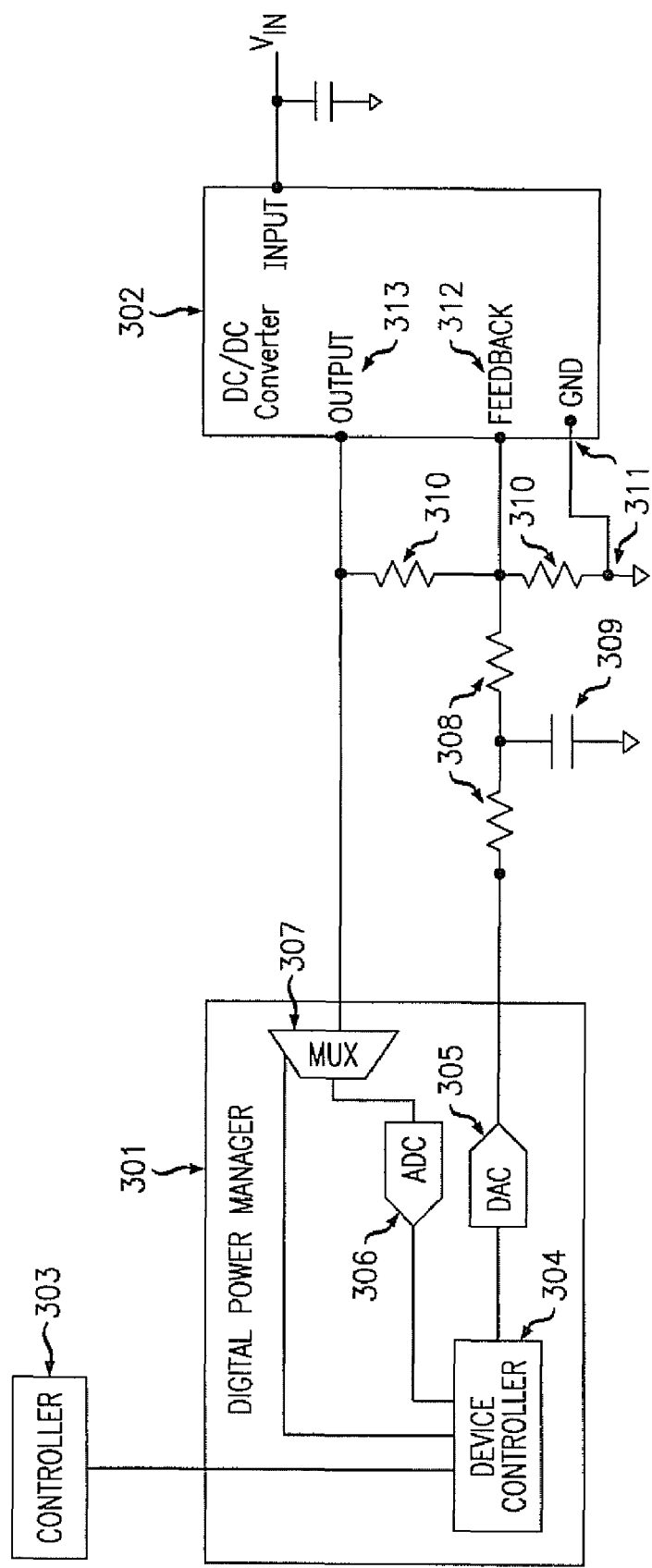
FIG. 3 illustrates a topology of the second DC/DC converter and a Digital Power Manager.

FIG. 3 shows in further detail the connections between the second converter 302, Digital Power Manager 301, and controller 303. As the AC Feed Monitor may provide a trim voltage to the first converter, the Digital Power Manager 301 under control of the controller 303, may provide a trim voltage to the feedback input of the second converter 302. Within the Digital Power Manager 301, a Device Controller 304 may be connected to the controller and a digital-to-analog converter (DAC) 305 to provide the trim voltage DACOUT$_2$ to the feedback node 312 of the second converter. In the depicted example, the Device Controller 304 also controls a multiplexer 307, whose output is connected to an analog-to-digital converter (ADC) 306 that outputs to the Device Controller 304.

The output of the ADC within the Digital Power Manager may be connected to the feedback node of the second converter through other components. The feedback node 312 of the second converter 302 may be connected to a voltage divider created by resistors 310 connected between feedback node 312 and output node 313, and feedback node 312 and ground 311, respectively. The voltage divider is connected in series with an RC circuit created by a series of attenuation resistors 308 connected to a trace noise decoupling capacitor 309. This RC series may be connected directly to the Digital Power Manager's DAC 305 and helps eliminate noise in DACOUT$_2$ before the voltage reaches the feedback node 312.

The output node 313 may be connected to the input of the multiplexer 307 of the DPM and provides the output voltage V$_{sense}$, which is equivalent to the output voltage provided to the bus. In an alternative embodiment, a resistor divider may be in series between the output node 313 and the controller incorporating the DPM when the output voltage is greater than the specifications of the controller 303.

Referring to FIG. 3, during operation of the illustrative example operations set forth, the controller 303 signals to the DPM by instructing the Device Controller 304 to provide a trim voltage to the second converter 302. The device controller 304 produces a signal that traverses through DAC 305 to create an analog DC voltage DACOUT$_2$. DACOUT$_2$ traverses to the feedback input 312 of the second converter 302. The second converter 302 adjusts internally to modify its output to match the feedback input DACOUT$_2$. The second converter 302 produces an output voltage V$_{sense}$ that traverses through the multiplexer 307 and ADC 306 to produce a digital signal recognizable by the Device Controller 304.

Figure 4:
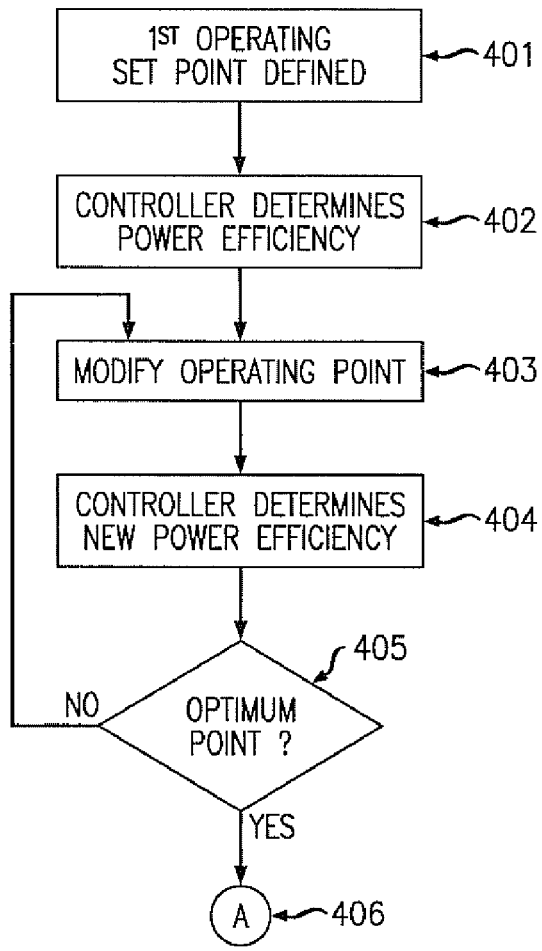
FIG. 4 illustrates a method of determining the system's optimal operating set point for a given AC input feed voltage and load.

FIG. 4 is one illustrative example of applying one method practiced on, for example, the FIG. 3 system, of determining an optimum set point for operating voltages of a first and second converter, for a given AC input and given active load. It will be understood that AC Feed input voltage traverses into the AC Feed Monitor, all components operate normally and provide power to the active load. In step 401, the operating set point is defined by the voltages and currents recorded at the inputs and outputs of both converters. Each set point determines a delivered power P$_{load}$ to the load. In step 402, the controller determines the efficiency of the set point by calculating the power efficiency of the load from a given input to the first converter, according to the formula: $\epsilon_p = P_{load}/P_{feed}$.

In step 403, the controller changes the operating set point of the system. In one example, the controller adjusts the output of only one converter at a time, as illustrated by the system of FIG. 3, where the controller 303 adjusts DACOUT$_2$ sent to the second converter's feedback node 312. In an alternative embodiment, the controller adjusts the outputs of both converters. In step 404, the controller then determines the power efficiency of the new operating set point and in step 405 compares the efficiency with at least the previous operating set point. If the controller determines that the operating point is not optimum, the controller returns to step 403 by adjusting the operating set point again. If the controller determines that the operating point is optimum, the controller determines the system is in a terminal state and continues to FIG. 5.

Figure 5:
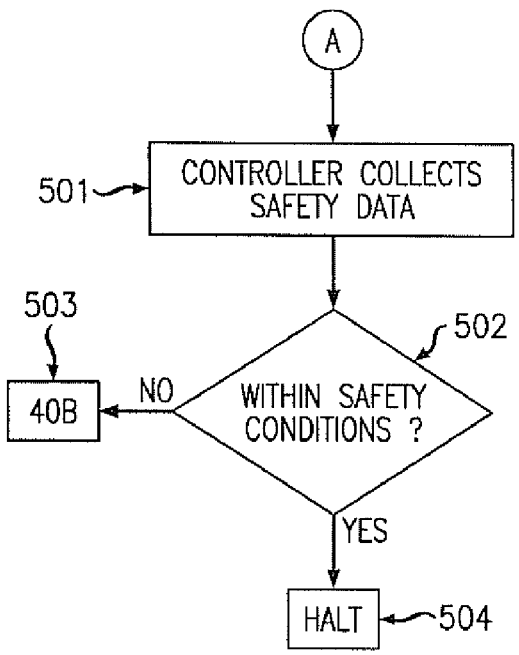
FIG. 5 illustrates a method of determining the system's overall functionality at an operating set point.

Referring to FIG. 5, in step 501, the controller, once determining that the system is operating in an optimum condition, uses other collected data to determine if the system is operating at a set point the system can handle. For example, the controller will check various temperature statuses to ensure none of the components overheat.

In step 501, the controller determines that the system is operating at an optimum set point when it determines that for a given AC input and load, the system maintains a maximum overall efficiency. The controller then progresses to step 502, where the controller evaluates other data collected throughout the system not relating to power. Such information includes temperatures and alarm statuses reported by the AC Feed Monitor and BUS Feed Monitor. This information may also include port status and load information reported through I²C communications by the active load. For example, the active load may report whether it is operating in normal or standby mode and whether it will switch operating modes. Using this information, the controller determines whether the system can operate properly at the current optimum set point. If so, the controller determines that the system is in steady-state equilibrium and all modification to the system halts at step 504 until at least the AC Feed input of the active load changes. If the controller does not determine that the system can function properly within the given parameters, the controller then goes to step 403 of the method in FIG. 4 to determine a new optimum operating set point.

Figure 6:
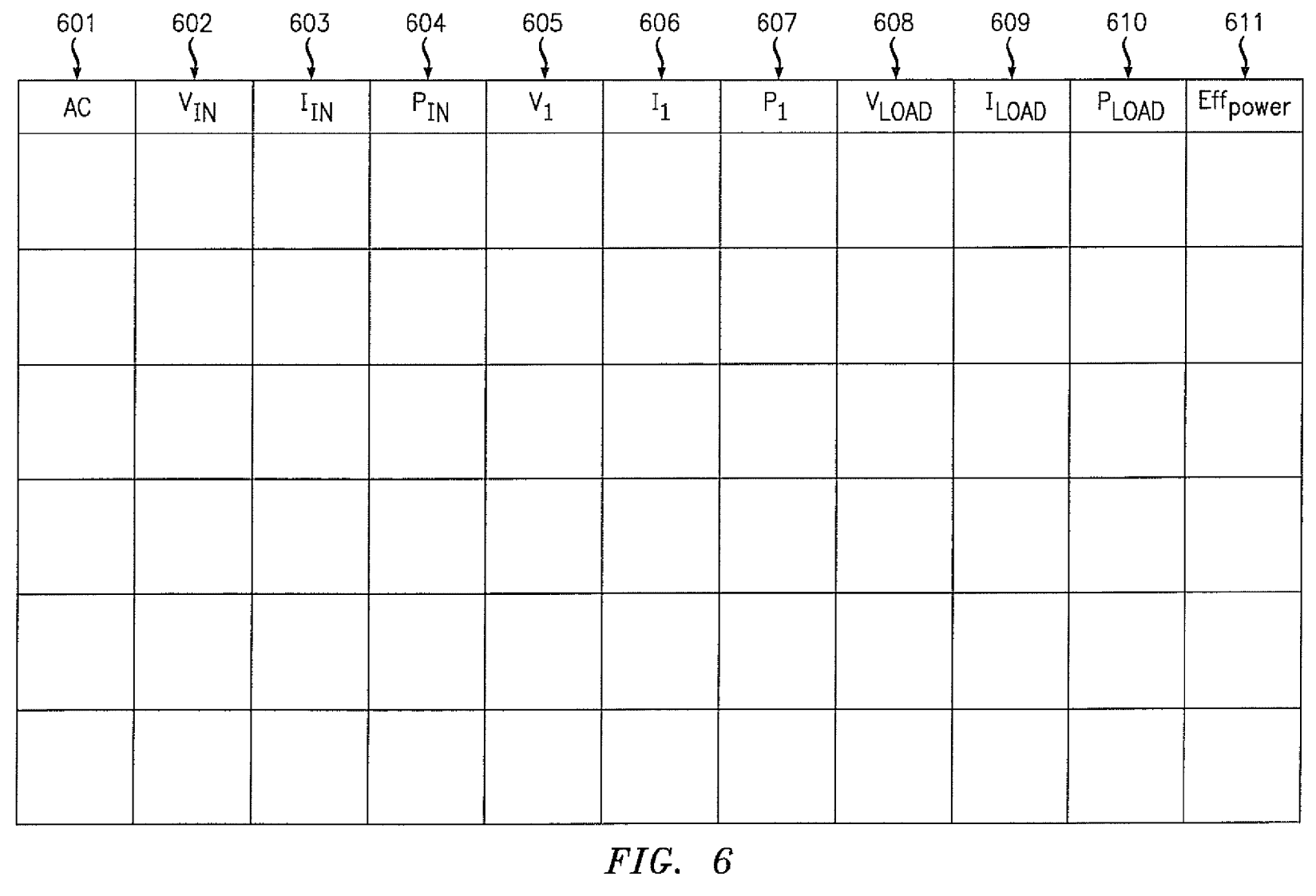

Referring to FIG. 6, in one example according to one embodiment, the controller maintains a storage such as, for example, a table 600 of power efficiencies 611 for each operating set point given an AC feed input and a specific output load. This table 600 may include at least the output power 607, voltage 605, and current 606 of the first converter, which is equivalent to the inputs of the second converter, and the output power 610, voltage 608, and current 609 of the second converter, which is the power delivered to the active load. In a preferred embodiment, this table also includes the input power 604, voltage 602, and current 603 delivered to the first converter. The controller uses the values recorded for each operating set point to determine each respective set point's power efficiency. In such an embodiment, the controller, instead of fully traversing the method outlined in FIG. 4, instead finds the optimum operating set point by using the table and modifying the system to operate at the set point determined to operate at the system's maximum power efficiency. Once set, the controller continues the method outlined in FIG. 5. When the controller determines that the system cannot function at this operating set point, the controller refers back to the table 600 and modifies the system to operate using the next-best operating set point. The controller continues this process until the system is in steady-state equilibrium for a given input AC voltage and active load.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A closed-loop system to convert AC power to DC power, the system comprising:
    a boost-buck converter unit to receive a first trim voltage and an externally generated first DC feed signal at a first DC voltage, and to generate a second DC feed signal having a second DC voltage based on said first DC voltage and said first trim voltage;
    a DC/DC converter unit to receive a second trim voltage and said second DC feed signal, and to generate a DC output supply signal, having a DC output supply voltage based on said second DC voltage and said second trim voltage;
    a bus connected to said DC/DC converter unit to carry said DC output supply signal to at least one external load;
    a first power loss sensor to generate a first power loss data indicative of a power loss in said boost-buck converter unit, based on said first DC feed signal and said second DC feed signal;
    a second power loss sensor to generate a second power loss data indicative of a power loss in said DC/DC converter unit, based on said second DC feed signal and said DC output supply signal; and
    a controller to generate a system power efficiency data based on said first and second power loss data, and to generate said first and second trim voltages based on said system power efficiency data to power efficiency of said system.

2. The closed-loop system of claim 1,
    wherein the first power loss sensor is configured to sense an amperage of the first DC feed signal and the value of said first DC feed voltage and wherein the first power loss sensor bases the first power loss dataset on the detected amperage of the first DC feed signal, value of said first DC feed voltage, amperage of the second DC feed signal and value of said second DC feed voltage; and
    wherein the second power loss sensor is configured to sense an amperage of the DC supply signal and the value of said DC supply signal voltage and wherein the second power loss sensor bases the second power loss dataset on the detected amperage of the DC supply signal, value of said DC supply signal voltage, amperage of the second DC feed signal and value of said second DC feed voltage.

3. The system of claim 2, further comprising:
    a first trim voltage provider to provide the first trim voltage to the feedback input of the boost-buck converter based on a first trim voltage dataset generated by said controller; and
    a second trim voltage provider to provide the second trim voltage to the feedback input of the DC/DC converter based on a second trim voltage dataset generated by said controller;
    wherein each said trim voltage provider receives a respective trim voltage dataset from said controller.

4. The system of claim 2, further comprising:
    an AC Feed Monitor to receive an AC input voltage and to generate said first DC feed signal at a first DC voltage, said AC Feed Monitor further configured to comprise the first power loss sensor and the first trim voltage provider; and
    a BUS Feed monitor to receive the DC output supply signal, said BUS Feed Monitor further configured to comprise the second power loss sensor.

5. The system of claim 4, further comprising:
    a series of opto-isolators to connect the controller to components of said system of which the controller does not share a common electrical ground.

6. The system of claim 5, further comprising:
    a Digital Power Manager comprising said second trim voltage provider, said Digital Power Manager connected to said controller by one of said opto-isolators.

7. The closed-loop system of claim 1, wherein the boost-buck converter unit is a non-isolated single-ended primary inductor converter (SEPIC).

8. The closed-loop system of claim 1, wherein the DC/DC converter unit is selected from a group consisting of a flyback converter, push-pull converter, and forward converter.

9. A system of maximizing power efficiency in an AC/DC power conversion system, the system comprising:
    a first generating means to generate a first trim dataset to provide a first trim voltage to a first DC/DC conversion means through a second generating means, and a second trim dataset to provide a second trim voltage to a second DC/DC conversion means through a third generating means;
    a second generating means to generate the first trim voltage based on said first trim dataset;
    a third generating means to generate the second trim voltage based on said second trim dataset;
    a first sensing means to sense a first DC feed signal into the input and a second DC feed signal from the output of said first DC/DC conversion means and to create a first power loss dataset indicative of power loss in said first DC/DC conversion means;
    a second sensing means to sense the second DC feed signal into the input and a DC output supply signal from the output of said second DC/DC conversion means and to create a second power loss dataset indicative of power loss in said second DC/DC conversion means; and
    a controlling means, said controlling means comprised to:
        receive said first and second power loss datasets from said first and second sensing means;
        calculate a first power efficiency dataset of said system based on said first and second power loss datasets;
        modify at least one of the first and second trim voltage datasets to a new value to produce a second power efficiency dataset;
        compare said first and second power efficiency datasets;
        determine when a termination condition has occurred; and
        halt further modification once said termination condition has occurred.

10. A method of maximizing power efficiency in an AC/DC power conversion system, the method comprising:
    i. generating, by a controller, a first trim dataset to provide a first trim voltage to a boost-buck converter through a first trim voltage provider, and a second trim dataset to provide a second trim voltage to a DC/DC converter through a second trim voltage provider;

ii. generating, by said first trim voltage provider, said first trim voltage based on said first trim voltage dataset;

iii. generating, by said second trim voltage provider, a second trim voltage based on said second trim voltage dataset;

iv. creating, by a first power loss sensor, a first power loss dataset indicative of a power loss in said boost-buck converter unit, based on a first DC feed signal into the input and a second DC feed signal from the output of said boost-buck converter unit;

v. creating, by a second power loss sensor, a second power loss dataset indicative of a power loss in a DC/DC converter unit, based on said second DC feed signal into the input and a DC output supply signal from the output of said DC/DC converter unit;

vi. receiving, by said controller, said first and second power loss datasets from said first and second power loss sensors;

vii. calculating, by said controller, a first power efficiency dataset of said system based on said first and second power loss datasets;

viii. modifying, by said controller, at least one of the first and second trim voltage datasets to a new value and repeating steps ii. through vii. to produce a second power efficiency dataset ix. comparing, by said controller, said first and second power efficiency datasets; and x. repeating steps viii. and ix. until the controller determines a termination condition has occurred.

11. The method of claim 10, wherein the first power loss sensor creates the first power loss dataset by detecting amperages of the first and second DC feed signals, and the values of first and second DC feed voltages; and wherein the second power loss sensor creates the second power loss dataset by detecting amperages of the second DC feed signal and the DC output supply signal and the values of the second DC feed voltage and a DC output supply signal voltage.

12. The method of claim 10, wherein an AC Feed Monitor is configured to comprise the first power loss sensor and the first trim voltage; and wherein a BUS Feed Monitor is configured to comprise the second power loss sensor.

13. The method of claim 10, further comprising:

receiving, by a series of opto-isolators, said first and second power loss datasets; and sending, from the series of opto-isolators to the controller, said first and second power loss datasets.

14. The method of claim 13, wherein a Digital Power Manager comprises the second trim voltage provider, wherein the Digital Power Manager receives said first trim voltage dataset from the controller through an opto-isolator.

15. The method of claim 10, wherein the boost-buck converter is a non-isolated single-ended primary inductor converter (SEPIC).

16. The method of claim 10, wherein the DC/DC converter is selected from a group consisting of a flyback converter, push-pull converter, and forward converter.

* * * * *